United States Patent [19]

Schoenleber et al.

[11] Patent Number: 4,657,612

[45] Date of Patent: Apr. 14, 1987

[54] METHOD OF MAKING TWO-DIRECTIONAL POP-UP

[75] Inventors: Donald W. Schoenleber, Bellemead; D. Mark Bosler, Trenton, both of N.J.

[73] Assignee: Webcraft Technologies, Inc., No. Brunswick, N.J.

[21] Appl. No.: 713,601

[22] Filed: Mar. 19, 1985

[51] Int. Cl.$^{4}$ .......................... B31F 1/00; B32B 31/00

[52] U.S. Cl. .................................... 156/227; 156/196; 156/250; 446/148; D20/10

[58] Field of Search ............... 156/227, 196, 210, 226, 156/267, 270, 256, 263, 211, 217, 200, 202, 204, 250; 283/1 R; 446/148; D19/6, 7, 8; D20/10; 40/124.1

[56] References Cited

U.S. PATENT DOCUMENTS

| | | | |
|---|---|---|---|
| 1,992,618 | 2/1935 | Jeffreys | 446/148 |
| 4,337,589 | 6/1982 | Volkert et al. | 40/124.1 |

FOREIGN PATENT DOCUMENTS

| | | | |
|---|---|---|---|
| 291771 | 12/1931 | Italy | 446/148 |
| 2095173 | 9/1982 | United Kingdom | 156/227 |

*Primary Examiner*—Donald Czaja
*Assistant Examiner*—Louis Falasco
*Attorney, Agent, or Firm*—Shlesinger, Arkwright, Garvey & Fado

[57] ABSTRACT

A method of fabricated double pop-up pamphlets from a continuous moving web applies glue binding strips for two sets of pop-up panels along a common transverse line of the web at an end of each printed pamphlet section.

7 Claims, 6 Drawing Figures

METHOD OF MAKING TWO-DIRECTIONAL POP-UP

BACKGROUND OF THE INVENTION

This invention relates to an improved method for making a pop-up promotional advertising piece, and in particular to the method of producing a double pop-up piece from a continuous web of sheet material.

Pop-up advertising pieces have been well known and have been used for many years, primarily for speciality items such as greeting cards. Until lately such items have not found general use in the advertising field because most of the items require complex assembly operation and are for the most part hand produced, thereby pricing them out of reach for advertising purposes.

Within the last few years the use of pop-ups in advertising pieces has become possible with the ability to produce these pieces using mass production in-line web techniques. The Volkert U.S. Pat. No. 4,337,589, is of interest in this regard, inasmuch as it discloses use of mass produced manufacturing techniques for pop-up items.

The subject invention is directed towards producing an enhanced visual impact pop-up, which can be produced by mass production in-line techniques.

SUMMARY OF THE INVENTION

Accordingly, the present invention is directed to providing a pop-up having greater visual impact by mass production techniques.

This invention makes it possible to provide two pop-ups which extend in different directions to provide substantially greater visual impact than a single pop-up element.

The pop-up elements, although they extend in a different direction, are fabricated in a single pass through the press with a single glue application. The pamphlets are thus produced substantially more economically by this single pass process.

DESCRIPTION OF THE DRAWINGS

Figure 1:
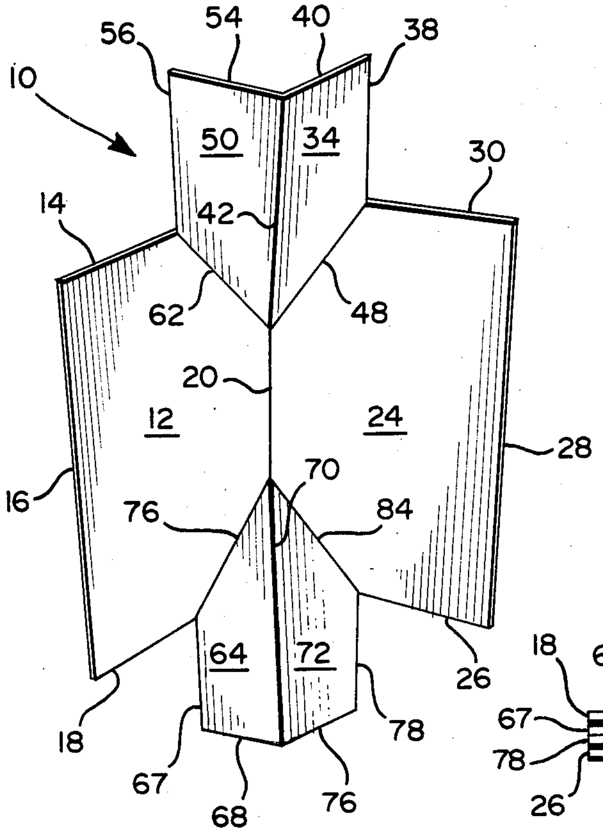
FIG. 1 is a perspective view of the double pop-up of the subject invention showing the pop-up pamphlets opened.

Referring particularly to the drawings, FIG. 1 discloses a double pop-up pamphlet generally indicated at 10 having a first cover page panel 12 with a top edge 14, a side edge 16 and a bottom edge 18.

Figure 2:
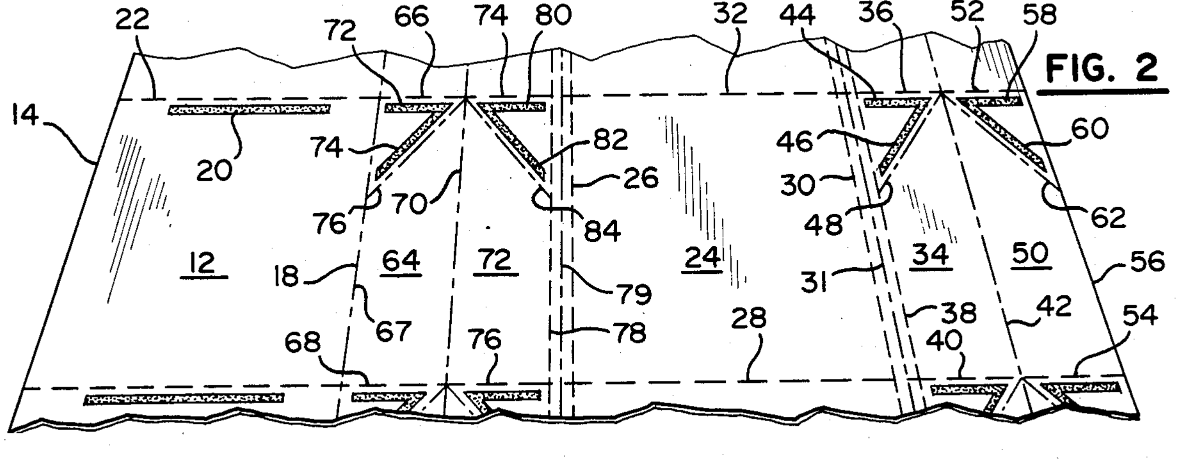
FIG. 2 is a partial view of the web of sheet material showing the layout of the panels and the arrangement after printing and application of glue stripes.

Reference to FIGS. 1 and 2 shows the relative panel arrangement in the web during initial fabrication and the corresponding position of the panels in the finished product as shown in FIG. 1. Note that in the web of FIG. 2, the longitudinal edges of the upper and lower edges of the finished pamphlet, and that successive pop-up pamphlet sections are bounded by upstream and downstream transverse dotted lines extending across the web. The dotted lines shown on the web of FIG. 2 are shown for illustration purposes to define the boundary of the successive pop-up pamphlet sections.

As shown in FIG. 2, top edge 22 of cover page panel 12 is part of the downstream transverse boundary line and has a binding glue line 20 extending across its width. This glue line acts as the binder for holding the cover page panel 12 to corresponding cover page panel 24. Cover page panel 24 has a bottom edge 26, side edge 28, and top edge 30. The binding edge 32 not shown in FIG. 1, but shown in FIG. 2 is joined to binding edge 22 of panel 12 by the binding glue line 20 when the web is brought into its final configuration.

Referring to FIG. 2, it will be seen that the upper set of pop-up panels, 34 and 50 are disposed on the immediate right edge of the web with pop-up panels 34 being located immediately adjacent the centrally positioned cover page panel 24. The pop-up panel 34 is bounded at 36 along a common transverse web line, a side web 38 and an end edge 40 which it should be noted is disposed along the upstream transverse line on the web.

The longitudinally extending trimmable strip 31 separates pop-up panel 34 and cover page panel 24. The central edges of adjacent pop-up panels 34 and 50 meet along dotted line 42 which subsequently becomes a fold line between the two pop-up panels. Glue line 44 is disposed parallel to the downstream binding edge 36 of panel 34. It cooperates with angularly inclined glue line 46 to hold the pop-up panel 34 to the cover page panel 24 after the folding operation. The panel 50 has a binding edge 52, upstream edge 54 and web edge 56.

In the finished piece, as seen in FIG. 1, panel 52 is connected to panel 12, and has an outer free edge 54, formerly part of the transverse upstream edge of the web as shown in FIG. 2. The web edge 56 becomes the top edge 56 of one of the top set of pop-up panels, as shown in FIG. 1.

A binding glue line 58 is disposed adjacent line 52 and a pop-up panel securing angular line 60 extends across the panel. On the perspective view of the finished pamphlet will be noted that fold lines 48 and 62 on the pop-up panels 34 and 50 extend diagonally up along the cover page panels 24 and 12 respectively when the cover page panels are opened. For illustration, these lines are generally indicated as dotted lines 48 and 62 on FIG. 2, although they will not come into existence until the finished pamphlet with the sets of enclosed pop-up panels are moved up when the finished pamphlet is opened.

Referring to FIG. 1, the lower set of pop-up panels, including panels 64 and 72 are arranged in the same way as the upper set of panels. Panel 64 has a side edge 67 which extends longitudinally along the web as indicated in FIG. 2, and an upper edge 68 which extends along the dotted line 70 indicating a common boundary of the panels 64 and 72. But the fold line is not made until the subsequent operation which will be discussed below.

Glue lines 72 and 74 hold the pop-up panel to the adjacent cover panel in the finished article and line 76 indicates the line of fold.

Pop-up panel 72 of this set of pop-up panels is bounded by the upper binding edge 74 (FIG. 2) which extends along part of the downstream transverse line defining the boundary between envelope pamphlet sections. The lower edge 76 which after cutting along the upstream transverse line becomes the free edge 76 shown in FIG. 1. The side edge 78 forms the edge of the trimming strip 79 along which the pop-up panels will subsequently be folded when the webs travel through the remaining manufacturing steps for the finished pamphlet.

The pop-up binding adhesive line 80 is disposed parallel to the binding line 74. The pop-up folding glue line 82 is disposed at an angle of approximately 45° to line 80 and extends across the length of the pop-up. The fold line 84 is shown in FIG. 1 and its future position shown in dotted outline on the web at 84 of FIG. 2. This fold line will occur after the pamphlet is completed and subsequently opened.

FIG. 2 shows the arrangement on the web of the panels and the position of the glue line. It should be noted that the two sets of pop-up panels are disposed beside the central panel, and that the pop-up glue lines for both sets of panels are disposed adjacent the common transverse line of each pop-up panel section.

In order to obtain the two-directional pop-up arrangement of FIG. 1, it is essential that both adhesive glue lines be disposed adjacent this common transverse line. With the subsequent folding operations of FIGS. 3*a* through 3*d*, the fold arrangement of the panels and the subsequent folding operations necessary to complete the fabricated pop-up are shown.

Figure 3D:
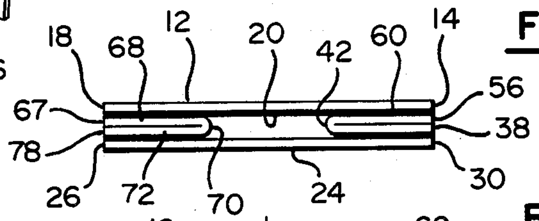
FIG. 3*d* is a section of the web after the edge trimming to free the pop-up and cover panels.
Figure 3C:
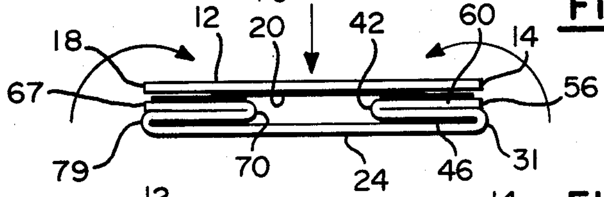
FIG. 3*c* is a section view of the web after folding of the sets of pop-up panels over the central cover page panel and the joining of the two webs to form a single composite strip.
Figure 3B:
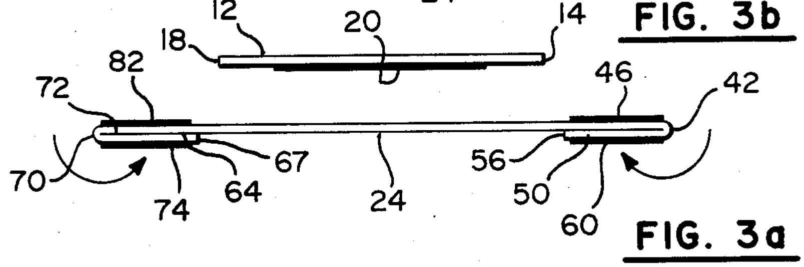
FIG. 3*b* shows an end section view of the web after separation of the outer cover page panel and the edge folding of the pop-up panels.
Figure 3A:
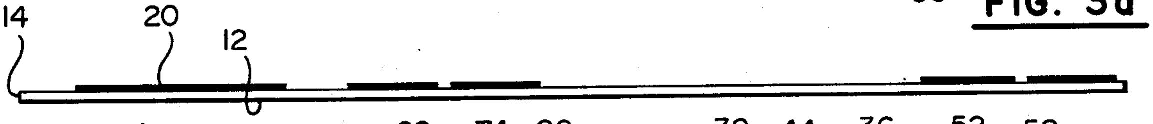
FIG. 3*a* is a section end view of the web of FIG. 2.

FIG. 3*a* is a section of the web illustrating its appearance in cross-section in the state of FIG. 2, with the two figures being shown in general alignment to illustrate the relative positioning of each of the panel areas. At the point of fabrication along the web where theweb lies flat.

The web is inseparated to form two separate webs by conventional techniques, such as slitting, along the line 18 of the web of FIG. 2 such that a second separate web containing the cover panel pieces 12 is produced. This separated second web is subsequently inverted and moved into superposed position above the original web above central cover page panel 24.

FIG. 3*b* shows a cross-section of the web further down, in which the panel 12 has been separated from the main web and positioned above and substantially spaced from the central cover page panel 24. Both of the end pop-up panels 50 and 54 have been folded down and under the web as illustrated by the arrows, along the fold lines 42 and 70 shown in dotted outline on FIG. 2, made.

FIG. 3*c* shows the next step in the further processing of the web at a further downstream point at which the two sets of pop-up panels have been edge folded upwardly and over the central cover page panel 24 bringing the glue lines 46 and 82 into contact with the downstream edge corners of the central cover page panel 24, the central upwardly folded motion is indicated by the two arrows. On completion of these folding operations, the upper cover page panel 12 is brought downwardly and into contact with the cover page panel and the pop-up panels such that the glue lines 60 and 74 are brought in contact with the panels.

Note that the trim sections 31 and 79 along the lower cover page panel 24 are along the side peripheries of the folded web and that point.

FIG. 3*d* shows the section along the web after trimming of the edge sections to remove the trim sections 31 and 79. The removal of the trim edges creates the edges 30 and 26 as illustrated in FIG. 3*d* along the top and bottom edges of the lower cover page panel. At the same time, the upper pop-up panel edges 38 and 78 are created. This will permit the sets of pop-up panels to move independently and outwardly away from the cover page panels when the cover page panels are separated. FIGS. 3*c* and 3*d* do not show the joinder of the cover page panels 20 and 4 along the common binding glue line 20. For purposes of illustration, it has been necessary to show the thickness and folds of the pop-up panels. In the actual printing, the pages are sufficiently thin such that when cover page panel is brought down into contact with the cover page panel 24 and the two sets of pop-up panels, it will also contact and bring together the binding glue strip 20 of cover page 12 and the edge of cover page 24.

Thus, the successive pamphlet sections are joined continuously as they pass the point at which the two cover panels are brought together. The subsequent operation is to separate the successive pamphlet sections from the web along the transverse lines to produce the plural individual double pop-up pamphlet pieces.

Thus, it will be seen that with the separating of the cover page panels of each pamphlet when the finished pamphlets are opened, the two sets of pop-up panels will move upwardly and outwardly as shown in FIG. 1. This two-directional arrangement is thus accomplished in a single one-directional pass of the web by the application of the pop-up glue adhesive lines along a common transverse line as indicated in FIG. 2.

While this invention is been described as having a preferred design, it is understood that it is capable of further modifications, uses and/or adaptations of the invention following in general the principal of the invention and including such departures from the present disclosure has come within known or customary practice in the art to which the invention pertains, and as may be applied to the central features hereinbefore set forth, and fall within the scope of the invention of the limits of the appended claims.

We claim:

1. A method of making a double pop-up pampheit, comprising:

(a) passing a web of sheet material through a press and printing along the length of the web successive pop-up pamphlets each of which include two sets of adjacent pop-up panels and two cover page panels all of which are longitudinally aligned, each of the sets of pop-up panels being disposed adjacent a different longitudinal side of a cover page panel, (b) applying plural gule lines to the panels of each pamphlet of the web adjacent a transverse edge thereof for holding the pop-up panels to the cover page panels, and also for holding the cover page panels together along a common edge, (c) separating one of the cover panels from the web, (d) edge folding the outer of each set of pop-up panels over the other and along a longitudinal line between them, (e) folding the folded pop-up panels over the adjacent cover page panel along a longitudinal line between the adjacent cover panel and pop-up panels, (f) placing one of the cover page panels above and directly over the other cover page panel such that each of the folded sets of pop-up panels are covered and adhere to an adjacent panel aling the transverse line, (g) cutting the pop-up panels free of the cover page panels along the fold lines between the cover panels and the sets of pop-up panels so that when the two adjacent cover page panels are opened one set of pop-up panels extends upwardly and outwardly and the other set of pop-up panels extend downwardly and inwardly with respect to the joined cover page panels, and (h) cutting the web along the transverse edge of successive pop-up pamphlet section to provide a plurality of individual finished pamphlets.

2. The method of making a double pop-up pamplet as set forth in claim 1, including the steps of:

(a) printing one set of pop-up panels along an edge of the web and adjacent a central cover page panel, and the other set of pop-up panels on the other side of the central cover page panel, (b) printing the other cover page panel adjacent the other side of the web, and (c) slitting the web longitudinally along a longitudinal side edge of the second set of pop-up panels to provide two independent webs, prior to edge folding the set of pop-up panels.

3. The method of making a double pop-up pamphlet as set forth in claim 1, including the steps of:

(a) applying the glue lines to the printed pamphlet sections which are at an angular inclination approximtely 45° with respect to the longitudinal direction of the web, and extend from close to the transverse edge line along the length which is aligned with and extends nearly the whole width of the pop-up panel, and (b) applying a binding glue line parallel and close to the transverse edge of the printed pop-up to provide adhesion along the entire width of the cover page panels from which the pop-up glue lines extend.

4. A method of making a double pop-up panel as set forth in claim 3, including the steps of:

(a) placing an additional longitudinally extending trim section between each set of pop-up panels and the adjacent cover page panel within which the longitudinal fold is made between the pop-up panels of each set and the cover page panel, such section extending outwardly beyond the panels along a side edge of the web after folding, and (b) cutting the pop-up panels free of the adjacent cover page panel by trimming the trim section from the side edge of the previously folded section.

5. The method of making a double pop-up pamphlet as set forth in claim 4, including the steps of:

(a) printing one set of pop-up panels along an edge of the web and adjacent the central cover page panel, and the other set of pop-up panels on the other side of the central pop-up panel and adjacent the other side of the web, and (b) slitting the web longitudinally along a longitudinal side edge of the second set of pop-up panels to provide two independent webs, prior to edge folding the set of pop-up panels.

6. The method of making a double pop-up pamphlet as set forth in claim 3, including the step of:

(a) moving one of the separated sections of the web into direct overhead alignment with the other corresponding section of the web such that the cover page panels are placed one above the other prior to joining the cover page panels together.

7. The method of making a double pop-up pamphlet as set forth in claim 6, including the steps of:

(a) printing one set of pop-up panels along an edge of the web and adjacent a central cover page panel, and the other set of pop-up panels on the other side of the central pop-up panel, the other cover page panel being printed adjacent the other side of the web, and (b) slitting the web longitudinally along a longitudinal side edge of the second set of pop-up panels to provide two independent webs, prior to edge folding the set of pop-up panels.

* * * * *